INVENTOR.
TORSTEIN (NMI) STRAND
ELY S. LEVINSKY
MITCHELL E. TIMIN

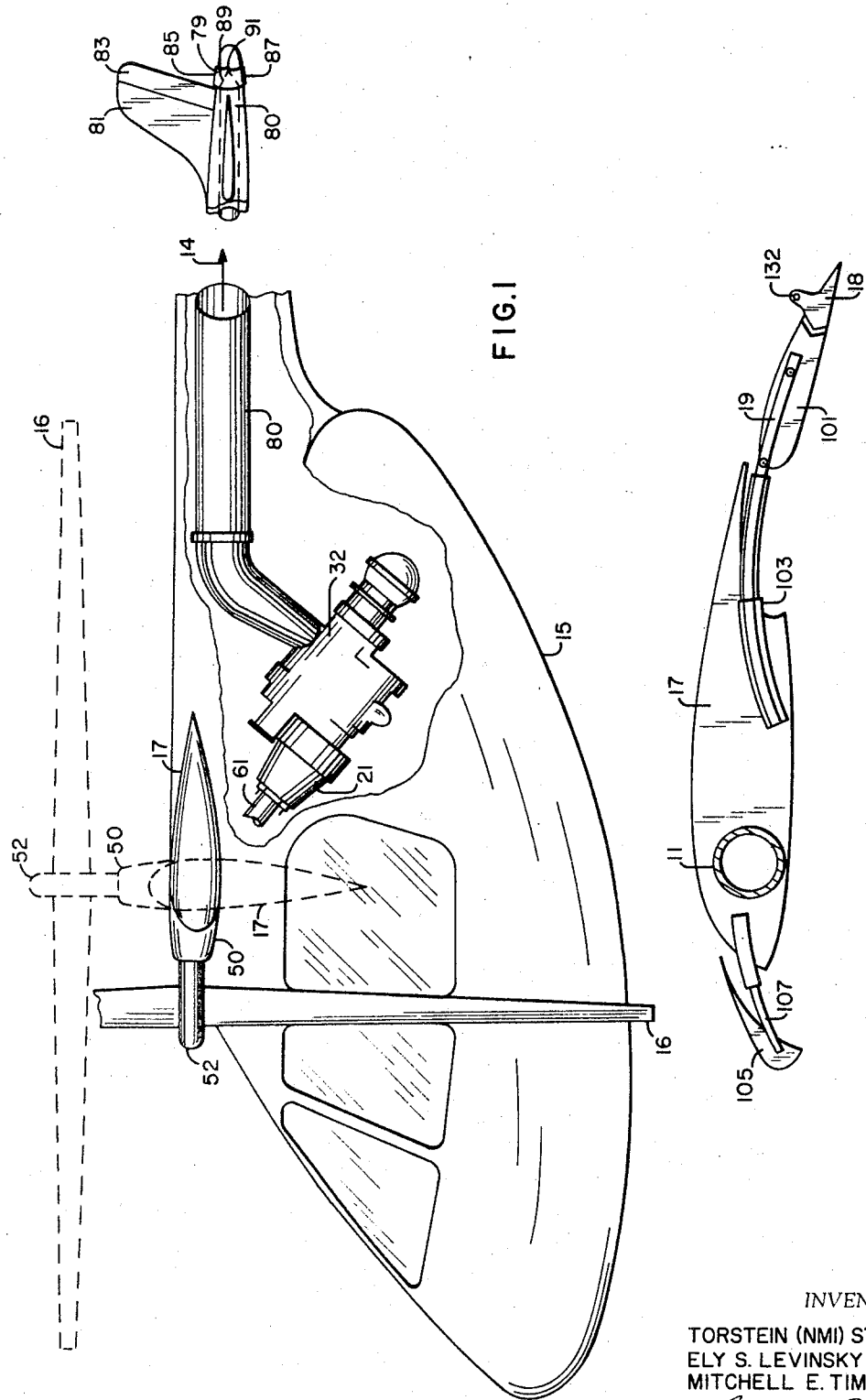

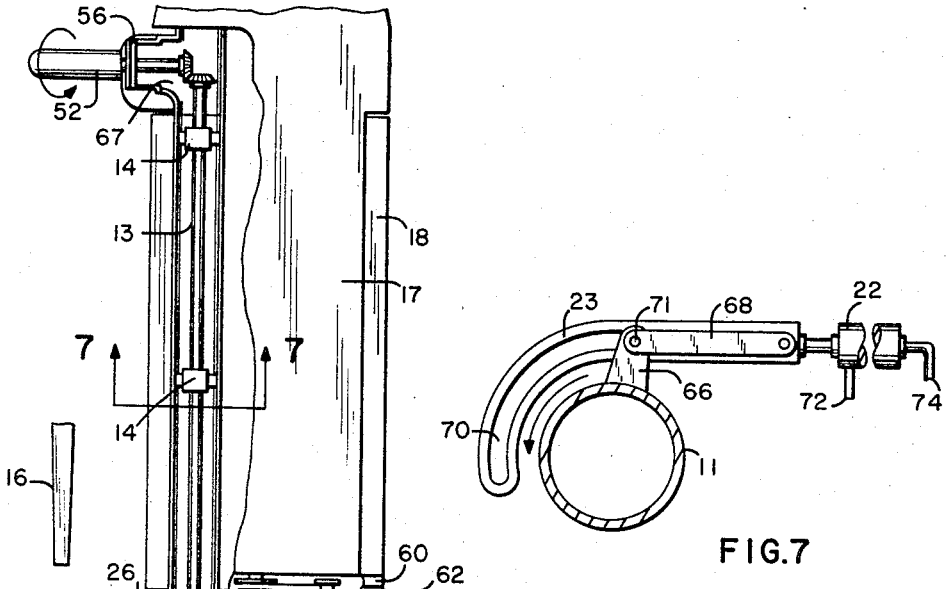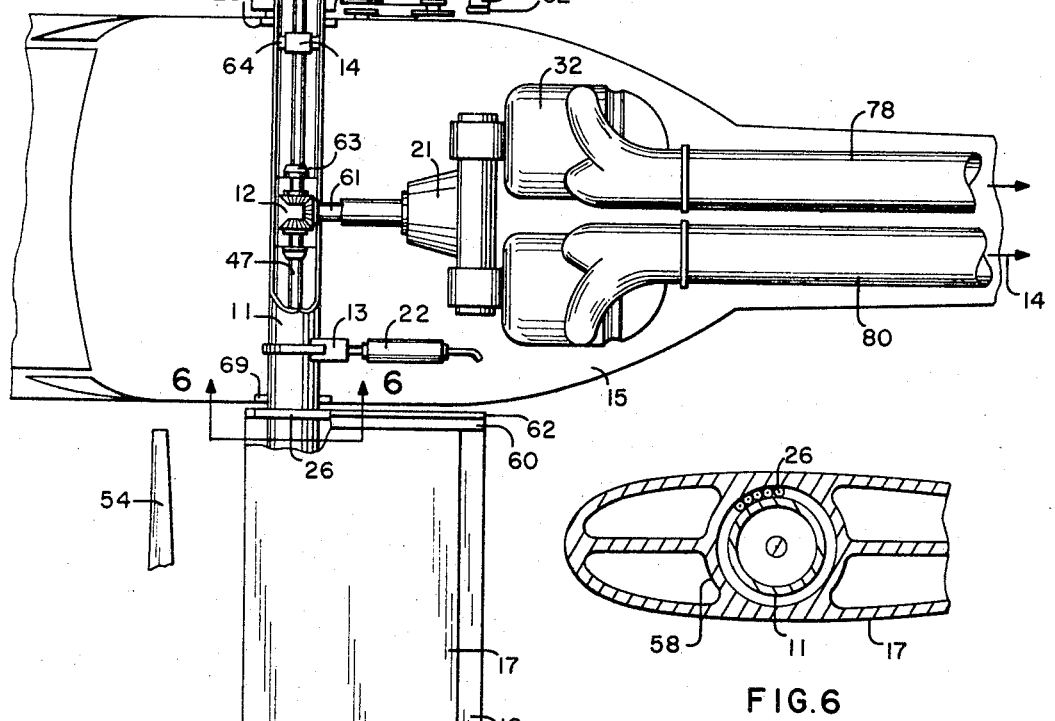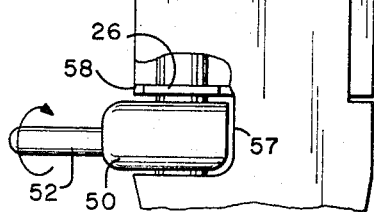

*Carl R. Brown*

ATTORNEY

INVENTOR.
TORSTEIN (NMI) STRAND
BY ELY S. LEVINSKY
MITCHELL E. TIMIN

ATTORNEY

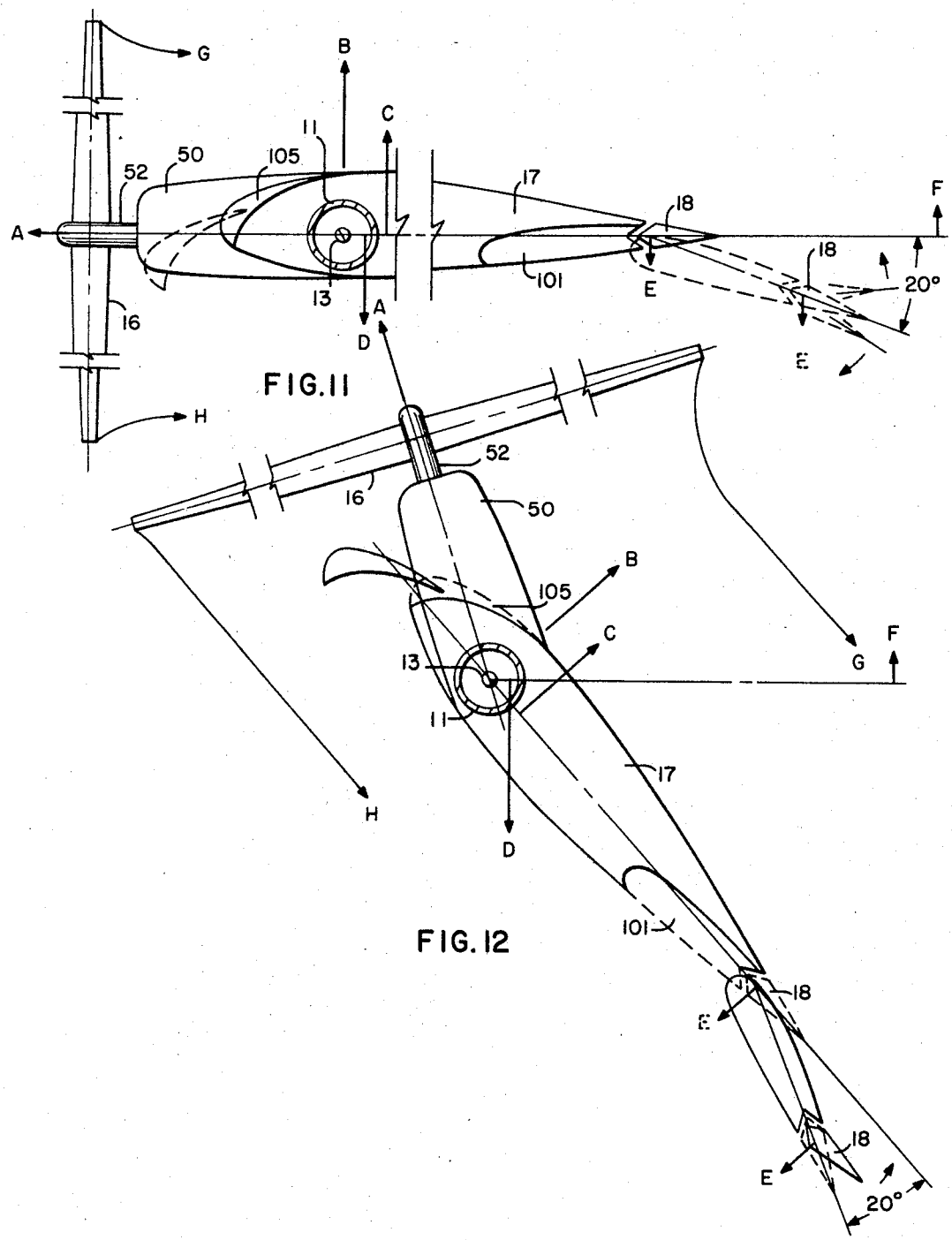

United States Patent Office 3,430,894
Patented Mar. 4, 1969

3,430,894
VTOL AIRCRAFT HAVING FREE-FLOATING WINGS AND INDEPENDENTLY TILTING PROPELLERS
Torstein Strand, Ely S. Levinsky, and Mitchell E. Timin, San Diego, Calif., assignors to Air Vehicle Corporation, La Jolla, Calif., a corporation of California
Filed Apr. 17, 1967, Ser. No. 631,294
U.S. Cl. 244—7                                                     9 Claims
Int. Cl. B64c 27/22, 29/00, 3/38

ABSTRACT OF THE DISCLOSURE

This invention relates to an aircraft having vertical takeoff and landing capabilities with free-floating, tilting wings being controlled by means of pilot actuated wing tabs and having tilting propellers that pivot relative to the aircraft and wings.

*Background of the invention*

There are many known types and designs of VTOL aircraft, most of which have propeller propulsion means mounted in the wings or propeller propulsion means that are selectively rotated with the wings relative to the fuselage of the aircraft. In the latter, the propellers and wings are rotated to a vertical direction for vertical takeoff and then are rotated gradually from the vertical to the horizontal direction to provide transition of flight from vertical to horizontal. Such aircraft require a rather large wing surface to asure stall free flight transition from the vertical to the horizontal. This large wing surface is disadvantagous to the aircraft in its horizontal flight or cruise performance, because the drag is larger than it would have been with a smaller wing. In addition there is a weight penalty associated with that part of the wing which is only needed to prevent stall in transitional flight.

Other VTOL aircraft have tilting propeller propulsion with fixed wings. In this case a large amount of the propeller thrust is lost during the hover flight due to the download of the propeller slipstream on the fixed wing, and the wing does not provide stall free transitional flight.

*Summary of the invention*

It is therefore advantageous to provide a VTOL aircraft having stall free flight transition characteristics and which aircraft has automatic wing tilting capability with a small wing size that is optimized for cruise performance.

This invention generally comprises an aircraft having a pair of free-floating wings. These wings are rotatably supported on a transverse member that extends through the fuselage of the aicraft. The propellers are positioned adjacent to the tips of the wings with propeller driving transmission means, both of which are freely rotated from a horizontal to a vertical direction relative to the fuselage of the aircraft. The propeller tilt causes the slipstream to deflect, and the free-floating wing (with fixed tab position) rotates so as to always maintain a fixed angle-of-attack with respect to the local slipstream direction. The aircraft has means in the tail such as a directed engine exhaust or duct fan propulsion means or the like for maintaining sufficient lift on the tail to hold the tail of the fuselage in a horizontal position in the vertical takeoff flight mode and during early transitional flight. Monocyclic propeller pitch control could also be used for this purpose.

The free-floating wing has tab means on its trailing edge that is directly controlled by the pilot through a stick actuated linkage. The tab control means controls the relative position of the wing to the local wind direction inside the propeller slipstream during flight. The pilot actuated tab control mechanism rigidly positions the tab relative to the cord of the wing irrespective of the position the free-floating wing may assume relative to the rest of the aircraft. Thus the pilot through normal known differential control linkages actuates the tabs to move the wing panels in the same direction or in opposite directions to control the flight of the aircraft in a manner similar to normal pitch and aileron control of tail-less aircraft in cruise flight. Further the pilot through the tab control is able to control the position of the free-floating wings relative to the local wind direction inside the propeller slipstream, during transition from vertical flight to horizontal flight and from horizontal flight to vertical flight. Also, the free-floating wing has known slats and flap-extension means that increase the overall area of the wing approximately 50 percent, and which may be extracted in the known manner to reduce the size of the wing in its normal cruise mode of flight. An extensible translating mechanism permits the tab to be controlled by the pilot during all movements of the wing and also during extension of the flaps.

It is therefore an object of this invention to provide a new and improved VTOL type aircraft.

It is another object of this invention to provide a new and improved VTOL type aircraft having stall free transition characteristics in all flight conditions.

It is another object of this invention to provide a new and improved VTOL type aircraft having automatic wing tilting capability in response to the slipstream of the propeller.

It is another object of this invention to provide a new and improved VTOL type aircraft having stall free transition characteristics and yet having small wing surface area optimized for cruise performance.

It is another object of this invention to provide a new and improved VTOL type aircraft requiring only small stability and trim changes during transition from vertical to horizontal flight.

Other objects and advantages of this invention will become more apparent upon an examination of the following detailed description and drawings in which like reference numerals designate like part throughout the figures and in which:

FIGURE 1 is a side view of an embodiment of the aircraft of this invention with parts broken away and parts shown in schematic;

FIGURE 2 is a top view of the embodiment of the aircraft in FIGURE 1 with parts broken away and parts shown in schematic;

FIGURE 5 is a schematic view of the free-floating wing illustrating the movement of the slats and flaps;

FIGURE 6 is a sectional view taken along lines 6—6 of FIGURE 2;

FIGURE 7 is a schematic illustration of the mechanism for controlling the rotationa pivoting position of the propellers;

FIGURE 11 is a schematic side view of the floating wing with propellers that illustrates schematically the lift forces and wind forces on the free-floating wing;

FIGURE 12 is a schematic view of the free-floating wing and propeller thrust unit in the transitional stage between vertical and horizontal flight of the aircraft.

Figure 3:
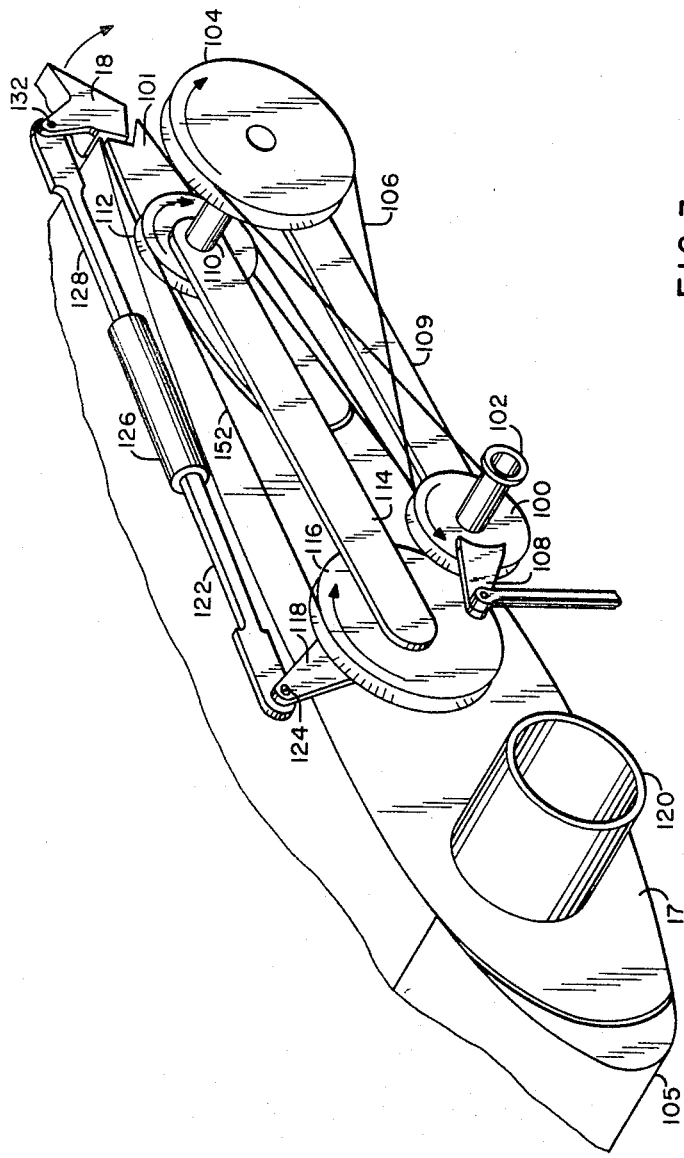
FIGURE 3 is a view in perspective of the mechanism for controlling the tab.

Referring now to FIGURE 1 there is shown a vertical takeoff and landing (VTOL) aircraft that utilizes a free-floating wing with tilting propellers mounted adjacent to each wing tip. The fuselage 15 may take any general form and functions in the normal manner for carrying passengers, cargo, controls for operating the aircraft and the like. The aircraft has a propulsion unit 32, see FIGURES 1 and 2, that has a pair of coupled engines with a pair of exhaust ducts 78 and 80. The engines 32 have a compound transmisison and drive shaft means 21 that jointly drives shaft 61. Drive shaft 61 has a bevel gear combination 12 that in turn drives a right drive shaft 13 and a left drive shaft 47. These right and left drive shafts pass through bevel gear drive mechanisms 67 for turning each of the propeller shafts 52. The drive shafts 13 and 47 are housed by a longitudinal housing 11 that extends through the aircraft and interconnects the two propeller drive mechanism housings 50. A plurality of bearings 14 support the drive shafts in the housing 11 and facilitate free rotation therein. It may be seen that the drive shaft mechanism turn the propellers in opposite directions as shown.

The aircraft has free-floating wings 17 that may include slats 105 and flaps 101 for increasing the area of the wing approximately 50 percent. The aircraft is capable of flying either with or without the slats and flaps.

The wings 17 are supported by bearings 26 on the longitudinal housing 11 that in turn supports and controls the pivotal position of the propellers 16 and 54 and the propeller housings 50. The propellers in the propeller housings are capable of being rotated from a horizontal to a substantially vertical position or through approximately a 90 degree arc. This is accomplished by rotating longitudinal housing 11 that is fixed to the propeller housing 50 that in turn rotates the drive shafts 52 that support the propellers 16 and 54. A means for selectively rotating and positioning shaft 11 is illustrated in FIGURE 7 and comprises a horn 66 fixed to housing 11 that is rotated by shaft 71 in the arc shaped channel 70 of member 23. Link 68 is connected to a hydraulic drive means 22 that is supplied with hydraulic fluid in the well known manner through tubes 72 and 74. Thus when the pilot actuates the hydraulic unit 22, housing 11 selectively pivots the propeller housing 50 and the propellers between horizontal and vertical. Housing 11 is supported in the fuselage by bearings 69. Also the free-floating wing structure is capable of free-floating rotational movement on bearings 26 around the longitudinal tube 11 as illustrated in FIGURE 6. It may thus be seen that the drive shafts rotate within the housing 11 and housing 11 rotates within the fuselage 15 and the wings 17 in turn freely rotate around the housing 11 and are supported thereon.

In the vertical takeoff mode, it is usually necessary to provide lift for the tail section of the fuselage of the aircraft. In this embodiment of applicant's invention, such a lift force is provided by directing the engine exhaust from exhaust ducts 78 and 80 through a directional venting means 79. Venting means 79 has open ducts 85 and 87 on the top and bottom sides of the fuselage. A pilot controlled pivotal plate 89 pivots around pivot point 91 to direct the exhaust gases out the upper outlet duct 85 or out the lower outlet duct 87 as necessary to provide positive or negative tail lift. Plate 89 may also be positioned horizontally relative to the fuselage to direct the exhaust gases out both ducts 85 and 87 to equalize the lift forces. It should also be recognized that the tail lift can be provided by a ducted fan type propulsion unit with fan pitch control in the horizontal portion of the tail section.

In flight control of the aircraft of this invention, the wings 17 are free-floating and the propellers 16 and 54 are rotatable through a 90 degree angle. Accordingly, the wing is capable of aligning itself with the prevailing wind direction inside the slipstream created by the propellers. This provides for a stable lift wing in all positions between vertical flight, hovering flight, transition flight from hovering flight to horizontal flight and in the horizontal flight mode. The free-floating wing is controllable in the flight modes to provide normal aileron control of the aircraft by using the entire wing surface to function as the ailerons. To move the free-floating wings in response to pilot control stick movements, a tab control surface is provided that control the lift moments on the wing relative to the air currents passing thereover and this rotates the free-floating wing to a zero pitching moment. The mechanisms for moving tab 18 and maintaining its controlled position relative to the wing 17 and the flap 101, are illustrated in FIGURES 3 and 4.

Referring now to FIGURE 3, a pilot control stick 146 is pivotally secured to the aircraft at 148 and is connected by linkage 142 to a bell crank 138. The bell crank is pivotally secured to the aircraft at 140. A pulley 100 is rotatably connected to the aircraft at 102 and has a horn 108 that is connected by rod 134 to one arm of the bell crank 136. It is thus apparent that by movement of the stick 146, bell crank 138 is rotated thereby rotating the pulley 100. The pulley 100 drives a free-floating pulley 104 by a cable 106 that is crossed over as shown. Pulley 104 is connected by shaft 110 to a pulley 112 that in turn drives a pulley 116, that is pivotally mounted on the wing structure 17, through a cable 152. A rigid space bar 114 maintains a rigid spacing and positioning of the pulleys 112 and 116 and a rigid space bar 109 maintains the spacing and positoning of pulley 100 and 104. Thus pulley 100 is connected to the fuselage of the aircraft and pulley 116 is connected to the free-floating wing structure 17 with pulleys 112 and 104 floating therebetween and being capable of scissor like movement. The center of pulley 116 is lower than the center of pulley 100. A horn 118 on pulley 116 is connected by pivotal connection 124 through linkage 122 and 128 to a horn 132 on the tab structure 18. Thus rotation of pulley 116 will in turn rotate the tab 18 that is pivotally secured and supported by either the trailing edge of the wing 17 in the known manner or is pivotally supported and connected to the trailing edge of the flap 101. Accordingly rotating pulley 100, for example in a counter clockwise direction, rotates pulleys 104 and 112 in a clockwise direction. Pulley 112 through cable 152 in turn rotates pulley 116 in a clockwise direction that through horn 118, linkage 122 and 128 in turn rotates tab 18 in a clockwise direction. Forward movement on stick 146 moves tab 18 in a clockwise direction and rearward movement on stick 146 moves tab 18 in a counter clockwise direction.

Figure 4:
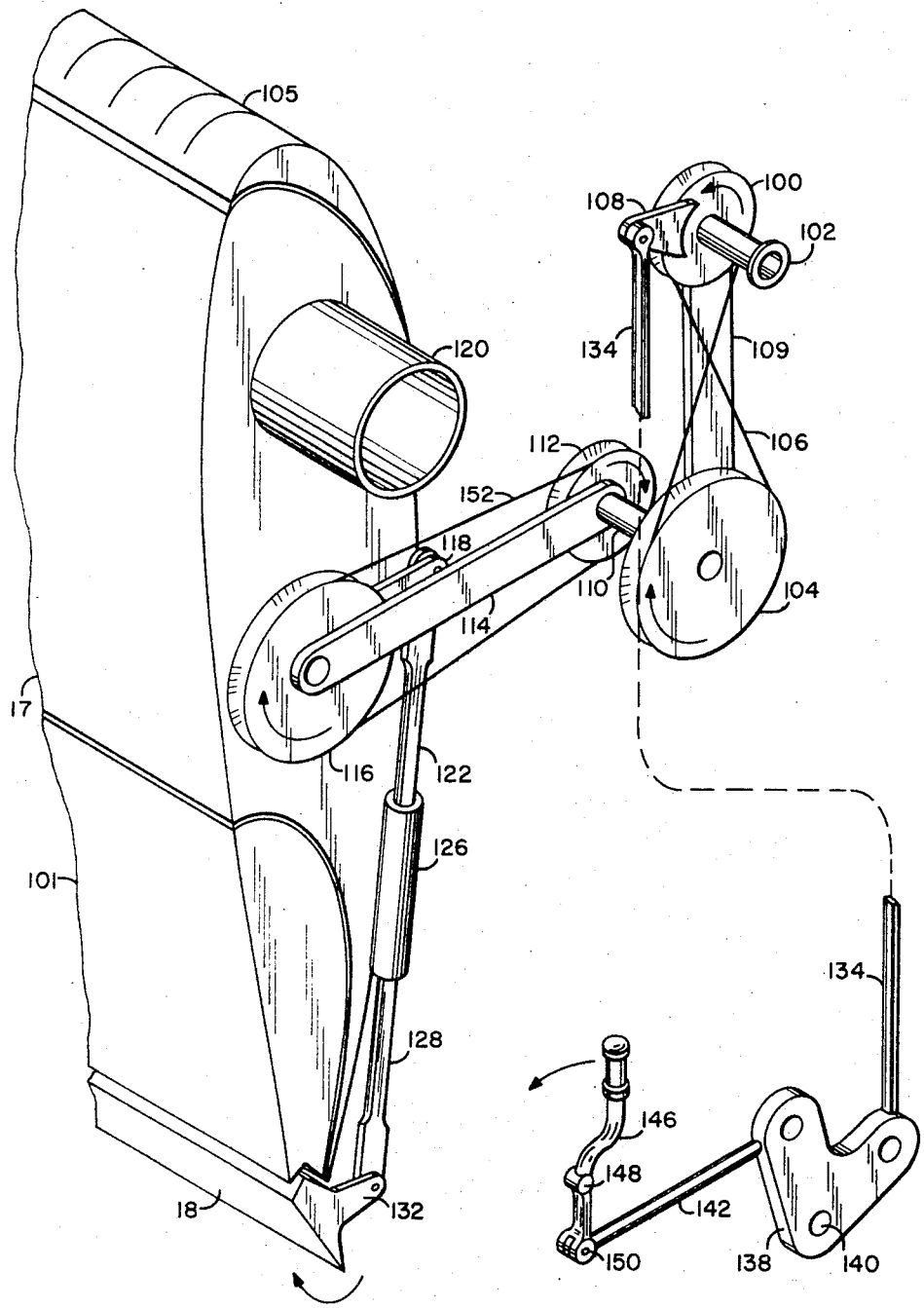
FIGURE 4 is a view of the mechanism for controlling the tab when the free-floating wing is in a substantially vertical position.

When the free-floating wing 17 pivots, as for example in response to air currents or in response to rotation of the propellers 16 and 54, the free-floating linkage is separated in sissor like fashion as illustrated in FIGURE 4. But the pulley structure is so arranged that rotation of the wing 17 relative to the fuselage does not cause a corresponding movement of the tab 18. Rather upon downward movement of the trailing edge of the wing 17, pulley 116 is tended to be rotated in a clockwise direction relative to the fuselage. This exerts a clockwise force on pulleys 112 and 104 that would be expected to exert a counter clockwise movement on pulley 100. However, there is also a downward movement of pulley 104 relative to pulley 100. These clockwise and counter clockwise movements of pulley 104 cancel and there is no resulting rotational movement between pulley 100 and tab 18 because of the pivotal movement of wing 17 relative to the fuselage 15.

When the wing uses a flap structure 101 that may be extended by any known extension means 103, the tab 18 is pivotally connected to the trailing edge of the flap 101. Thus upon extending the flap, the distance between pulley 116 and the tab 18 is increased. It is therefore necessary to provide a mechanism 126, as for example a well known Saginaw mechanism, that permits a lengthening of the relative length of rods 122 and 128 equal to the extension of the flap 101 and yet any movement of the pulley 116 will continue to provide the same corresponding movement through 122, 128 and lengthening mechanism 126 to move the tab 18.

Figure 8:
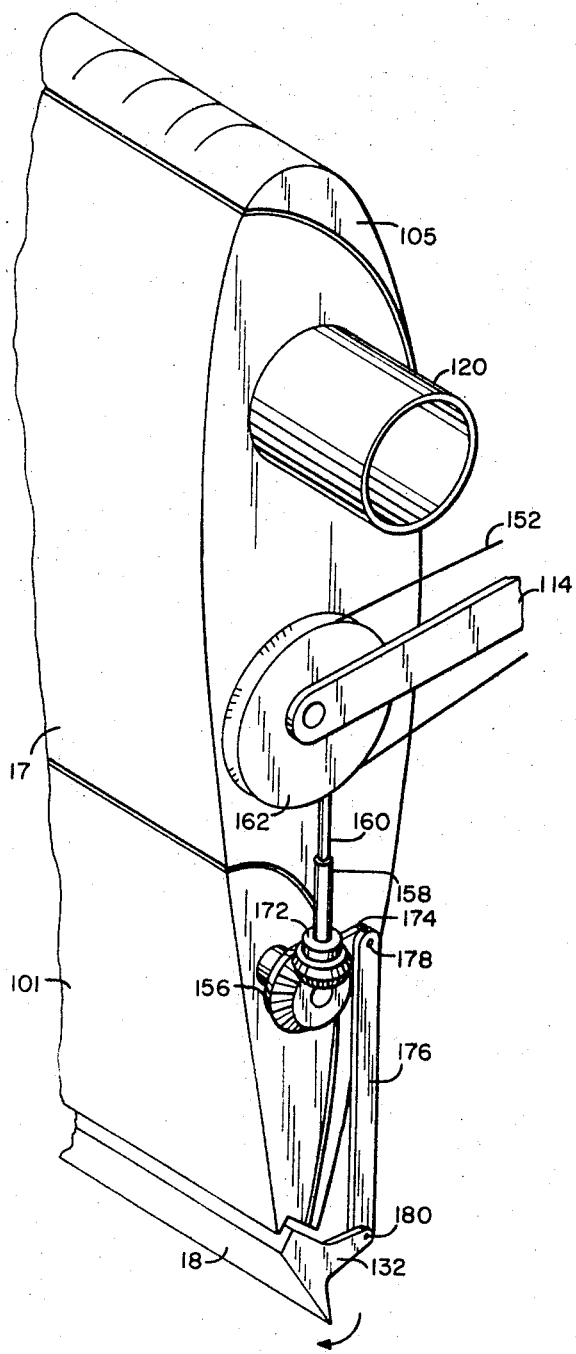
FIGURE 8 is a side view in perspective of a second embodiment of the mechanism for controlling the position of the tab structure.
Figure 10:
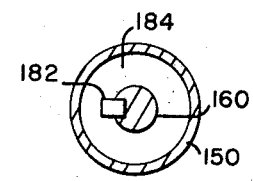
FIGURE 10 is a sectional view taken along lines 10—10 of FIGURE 9.
Figure 9:
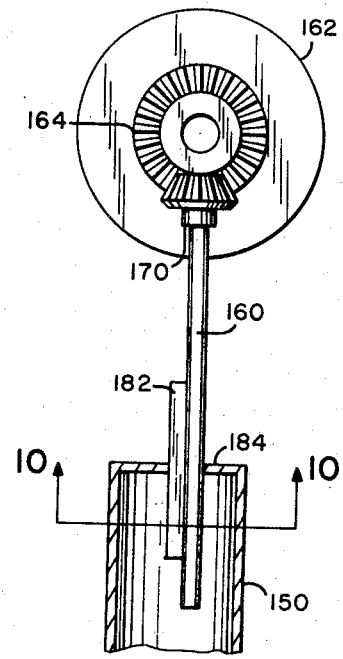
FIGURE 9 is a view of the operational parts of the modified tab control mechanism of FIGURE 8.

As an alternative, see FIGURES 8, 9 and 10, there is provided on the inner surface of pulley 116 a bevel gear 164 that contacts a bevel gear 170 on the end of rod 160. Rod 160 telescopes within a housing 150 on which is mounted a bevel gear 172 that engages gear teeth on the bevel gear 156 that is rotatably mounted on the flap 101. The end of rod 160 has a key 182 that coacts with a keyway slot in the end 184 of telescoping housing 150 for maintaining rotational positioning therebetween but allowing rod 160 to slidably move in telescopic fashion in and out of housing 150. So rotation of member 162 by cables 152 will rotate rod 160 and through engagement with teeth 170 will in turn rotate housing 150 rotating bevel gear 156. A horn on the bevel gear 156 is connected to push rod 176 that is connected to the horn 132 at 180. Thus rotation of gear 156 moves rod 176 that rotates the tab mechanism 18. The slat 105 may be extended by any known mechanism 107.

In horizontal flight, the free-floating wing 17 has the position generally shown in FIGURE 11 relative to its supporting housing 11 and is aligned with the local slipstream direction. The propeller slipstream and local wind direction generally has the direction shown by arrows G and H with the propeller thrust in the direction A. This tends to pull the aircraft through the air in the known manner with the local wind and propeller slipstream passing over the surface of the slat 105, wing surface 17, flap 101, and tab 18. The wing resultant lift is in the direction of arrow B and is ahead of the aircraft center of gravity as represented by arrow D. The counter clockwise moment of the wing lift C around the pivotal support of the free-floating wing on member 11, tends to cause the free-floating wing 17 to rotate in a counter clockwise direction. However there is a downward or negative lift E resulting from the tab 18 that, because of the length of the fulcrum arm around pivot arm point 11, balances out the counter clockwise rotational moment on the free-floating wing leaving a resultant lift of force C minus E which generally manifests itself in a lifting force B that acts through the hinged wing support 11. This free-floating wing 17 has inherent stability and when wind gust or other wind currents contact the wing at an angle, the wing reacts by turning into the direction of the wind sufficient to equalize the resulting lift on the wing surfaces. This is accomplished without movement of the tab 18 relative to the wing surfaces since the position of the tab is entirely controlled by the pilot in its relative position to the wing or flap surfaces.

When the aircraft 15 is in its vertical takeoff mode, then the propeller will be turned vertically as shown in FIGURE 1 and the aircraft will be lifted off the ground by the propeller thrust. In this mode, the free-floating wing will align with the propeller slipstream to a substantially vertical position. During transisition from vertical flight to horizontal flight, the propeller is pivoted by the mechanism 22 previously described in a gradual motion. At a point during this transition (see FIGURE 12), the propeller thrust is at an angle to vertical and the local wind is directed G and H at a downward angle by the propeller slipstream. At this point the free-floating wing 17 assumes the angle substantially as shown, relative to horizontal and relative to the angle of the propeller. Force vectors B, C, D and E are as shown and the aircraft is supported by the wing lift as well as by the propeller thrust. The tail portion of the aircraft is lifted in this mode by directing the engine exhaust gases downwardly providing a vertical lift force F. As the propeller is rotated to a more horizontal direction, then the wind vectors G and H assume a more horizontal direction and the free-floating wing 17 in turn assumes a more horizontal position until the propeller is in a horizontal mode and the wing 17 is also in a horizontal mode is illustrated in FIGURE 11.

Thus in operation when the aircraft is on the ground, the pilot rotates the propellers to a vertical position and operates the engine to provide the desired upward lifting thrust. After the airplane has been lifted off the ground by the propeller thrust and by the thrust of the directed exhaust in the tail section of the aircraft, the propeller is then gradually rotated into the local wind. This allows the aircraft to either hover in the local wind or to move forward in a horizontal direction. The position of the propeller and its thrust is continued to be adjusted through pivotal movement of the propeller until horizontal flight has been achieved. The lift of the wing as controlled by the tab is exerted through wing 17 to the housing 11 and is adjusted to give the desired lift to achieve a stable flight of the aircraft in transition from vertical to horizontal flight.

The flap system and the slat system can be eliminated if a larger wing area is substituted. However, one of the major advantages of this free-floating wing is to permit a smaller wing surface to be used in achieving vertical takeoff and stable transition from vertical to horizontal flight with a wing that does not have an excessive area.

The tab control mechanism for the right and left wings are connected together through a well known differential mechanism (not shown) such as used on existing tailless aircraft, through which; motion of the pilot's stick in the pitch direction causes simultaneous motion of the tabs and motion of the pilot's stick in the roll direction causes opposite simultaneous motion of the tabs.

Having thus disclosed our invention what we now claim is:

1. An aircraft having VTOL capability comprising:
  a fuselage and free floating wings,
  thrust generating means located along the length of said wings for providing lifting and propelling thrust to said aircraft,
  first support means for pivotably supporting said thrust generating means on said fuselage,
  second support means for supporting said free floating wings on said fuselage for free-floating movement relative to said fuselage and to said thrust generating means,
  tab means on the trailing edge of said free-floating wings for controlling the pivotal position of said wings,
  first pilot control means for controlling the position of said tab means relative to said wings,
  and second pilot control means for controlling the pivotal position of said thrust generating means.

2. An aircraft as claimed in claim 1 in which
  said second support means comprises a longitudinal hollow housing extending through the fuselage and said wings of said aircraft and is secured to said thrust generating means at the ends thereof.

3. An aircraft as claimed in claim 2, including
  a plurality of bearing connections that pivotally secure said wings to said housing.

4. An aircraft as claimed in claim 3 in which
  said thrust generating means comprises a pair of propellers,
  propulsion means for turning said propellers,
  and said propulsion means including an engine in said fuselage and a drive shaft positioned in said hollow housing.

5. An aircraft as claimed in claim 1 in which
  said first pilot control means comprises,
  first rotatable linkage means mounted on said free-floating wings and connected to said tab means for pivoting said tab means,
  second rotatable linkage means mounted on the fuselage of said aircraft and being rotatable by the pilot,
  and pivotal linkage means interconnecting said first and second rotatable linkage means for transmitting rotational force there between.

6. An aircraft as claimed in claim 5 in which
said pivotal linkage means comprising a pair of pulleys rigidly mounted on a shaft,
a pair of rigid links for pivotally securing said shaft to said first and second rotatable linkage means,
a first cable connecting said first rotatable linkage means with a first one of said pair of pulleys for rotating said first rotatable linkage means and said one of said pulleys in the same rotational direction,
and a second cable connecting said second rotatable linkage means to the other one of said pair of pulleys for rotating the said other one of said pulleys in a rotational direction opposite to the rotational movement of said second rotatable linkage means.

7. An aircraft as claimed in claim 6 in which
said wings include extendable flaps with said tab means being pivotally secured to the trailing edge of said flaps,
and said first rotatable linkage means including force translating means for transmitting pivotal force to said tab means during and after said flaps are extended.

8. An aircraft as claimed in claim 7 in which
said wings have extendable slats on the leading edges.

9. An aircraft as claimed in claim 1 including
a tail section,
and means for providing lift in said tail section during vertical flight of said aircraft.

References Cited

UNITED STATES PATENTS

| 2,708,081 | 5/1955 | Dobson | 244—7 |
| 3,166,271 | 1/1965 | Zuck | 244—7 |
| 3,197,157 | 7/1965 | King | 244—7 |

FERGUS S. MIDDLETON, *Primary Examiner.*

THOMAS W. BUCKMAN, *Assistant Examiner.*

U.S. Cl. X.R.

244—12, 39, 40